US009030575B2

(12) United States Patent
Bai et al.

(10) Patent No.: US 9,030,575 B2
(45) Date of Patent: May 12, 2015

(54) TRANSFORMATIONS AND WHITE POINT CONSTRAINT SOLUTIONS FOR A NOVEL CHROMATICITY SPACE

(75) Inventors: Yingjun Bai, San Jose, CA (US); Xuemei Zhang, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 645 days.

(21) Appl. No.: 13/342,873

(22) Filed: Jan. 3, 2012

(65) Prior Publication Data

US 2013/0093914 A1 Apr. 18, 2013

Related U.S. Application Data

(60) Provisional application No. 61/546,138, filed on Oct. 12, 2011.

(51) Int. Cl.
*H04N 1/60* (2006.01)
*H04N 9/04* (2006.01)
*H04N 9/73* (2006.01)

(52) U.S. Cl.
CPC ............... *H04N 1/608* (2013.01); *H04N 9/735* (2013.01); *H04N 9/045* (2013.01)

(58) Field of Classification Search
None
See application file for complete search history.

(56) References Cited

U.S. PATENT DOCUMENTS

| 8,290,258 B1* | 10/2012 | Polonsky | 382/167 |
|---|---|---|---|
| 2002/0101516 A1* | 8/2002 | Ikeda | 348/223 |
| 2003/0194125 A1* | 10/2003 | Hubel et al. | 382/162 |
| 2008/0049274 A1* | 2/2008 | Subbotin | 358/516 |
| 2009/0213251 A1* | 8/2009 | Mizukura et al. | 348/278 |
| 2009/0244316 A1* | 10/2009 | De Haan | 348/223.1 |
| 2010/0245618 A1* | 9/2010 | Ajito | 348/223.1 |

* cited by examiner

*Primary Examiner* — Jason Flohre
(74) *Attorney, Agent, or Firm* — Wong, Cabello, Lutsch, Rutherford & Brucculeri, LLP

(57) ABSTRACT

A novel chromaticity space is disclosed that may be used as a framework to implement an auto-white balance solution or other color image processing solutions that take advantage of the particular properties of the novel chromaticity space. The chromaticity space may be defined by using a series of mathematical transformations having parameters that are optimized to adapt to specific sensors' spectral sensitivities. The unique properties of the novel chromaticity space provide a conscious white point constraining strategy with clear physical meaning. In this chromaticity space, the ranges of possible white points under different kinds of lighting conditions can be defined by polygons. Because of the physical meaning the chromaticity space, the projection that is needed to bring an initially "out-of-bounds" white point back into the polygon also carries physical meaning, making the definition of projection behavior and its consequences conceptually clean and predictable.

21 Claims, 7 Drawing Sheets

TRANSFORMATIONS AND WHITE POINT CONSTRAINT SOLUTIONS FOR A NOVEL CHROMATICITY SPACE

CROSS-REFERENCE TO RELATED APPLICATION

This application claims priority to U.S. Provisional Patent Application Ser. No. 61/546,138, filed Oct. 12, 2011, which is hereby incorporated by reference in its entirety.

BACKGROUND

This disclosure relates generally to the field of image processing. More particularly, but not by way of limitation, it relates to techniques for creating a novel chromaticity space that may be used as a framework to perform color balancing on images captured by a variety of different image sensors.

Color balancing may be thought of as the global adjustment of the colors in an image. One goal of color balancing is to render specific colors, e.g., neutral white, as accurately as possible to the way the color appeared in the actual physical scene from which the image was captured. In the case of rendering neutral white colors correctly, the process is often referred to as "white balancing." Most digital cameras base their color balancing and color correction decisions at least in part on the type of scene illuminant. For example, the color of a white sheet of paper will appear differently under fluorescent lighting than it will in direct sunlight. The type of color correction to be performed may be specified manually by a user of the digital camera who knows the scene illuminant for the captured image, or may be set programmatically using one or more of a variety of automatic white balance (AWB) algorithms.

Chromaticity, as used herein, will refer to an objective specification of the quality of a color—independent of its luminance. Once luminance has been removed from consideration, the remaining components of a color can be defined by a pair of variables in a two-dimensional space. This is useful, as it allows the "chromaticity space" to be mapped into a 2D graph where all existing colors may be uniquely identified by an x-y coordinate position in the chromaticity space. Among the well-known chromaticity spaces are the a-b space of the CIELAB color space and the u-v space in CIELUV color space.

Generally, the definition of such a color space is not application-dependent, although color spaces may be created for a particular application. For example, the novel chromaticity space disclosed herein may be applied, in one embodiment, to scene white point calculation. Novel chromaticity spaces, such as those disclosed herein, were designed to work with different imaging sensors having different spectral sensitivity responses. One property of such novel chromaticity spaces is that various "physical" properties of the chromaticity spaces are able to remain consistent across imaging sensors having various spectral sensitivity responses. However, the parameters of the calculations used to transform the image data into such chromaticity spaces may be adaptive from sensor to sensor. Accordingly, the disclosed techniques provide a series of transformations to define a novel chromaticity space that is conceptually sound and computationally efficient, e.g., when used to calculate scene white point.

SUMMARY

This disclosure pertains to devices and computer readable media for implementing a novel chromaticity space and its applications. The chromaticity space may be used as a working space to implement an auto white balance (AWB) solution that takes advantage of particular properties of this chromaticity space. The chromaticity space may be defined by using a series of mathematical transforms having parameters that are optimized to adapt to specific sensors' (e.g., CMOS sensors) spectral sensitivities, i.e., the degree to which a particular sensor responds at any given wavelength of light.

In the final 2D chromaticity space, black body light source x-coordinates may form an essentially straight horizontal line. The horizontal axis of the chromaticity space is along the blue-red direction that correlates to correlated color temperature (CCT) of the light sources. The vertical direction is along the green-purple direction. Along the vertical direction, if the y-coordinate of an illuminant is farther away from the black body line, the color rendering index (CRI) of that the light source usually goes lower. The unique properties of the above-defined chromaticity space provide for the application of a conscious white point constraining strategy with clear physical meaning.

In this chromaticity space, the ranges of possible white points under different kinds of lighting conditions can be defined by polygons. These polygons can be degenerated into individual line segments. Because of the physical meaning the chromaticity space, the projection that is needed to bring an initially "out-of-bounds" white point back into the polygon also carries physical meaning, making the definition of projection behavior and its consequences conceptually clean and predictable. Not only are the projections in this chromaticity space conceptually sound, they are also relatively hardware and software friendly, as a projection calculation is only needed for one ordinate.

Thus, in one embodiment described herein, a process that may be carried out by hardware and/or software is disclosed comprising: obtaining image data representing a physical scene from an image captured by an image sensor of an image capture device; transforming the image data into chrominance values, wherein the chrominance values exist in a two-dimensional chromaticity space; rotating the chromaticity space to enforce a first chromaticity space physical property; identifying a white point constraint zone in the chromaticity space, based at least in part on the first chromaticity space physical property; and then shearing at least some the transformed image data to enforce a second chromaticity space physical property.

In some embodiments described herein, the process may then optionally calculate a scene white point for the image data in the chromaticity space based on the transformed values and the identified white point constraint zone.

A novel and improved chromaticity space with clear physical meaning for constraining the white point and providing an auto white balance framework in accordance with the various embodiments described herein may be implemented directly by a device's hardware and/or software, thus making these robust image processing techniques readily applicable to any number of electronic image capture devices with appropriate image sensors, such as mobile phones, personal data assistants (PDAs), portable music players, digital cameras, as well as laptop and tablet computer systems.

DETAILED DESCRIPTION

The techniques disclosed herein are applicable to any number of electronic image capture devices with image sensors, such as digital cameras, digital video cameras, mobile phones, personal data assistants (PDAs), portable music players, as well as laptop and tablet computer systems.

In the interest of clarity, not all features of an actual implementation are described in this specification. It will of course be appreciated that in the development of any such actual implementation (as in any development project), numerous decisions must be made to achieve the developers' specific goals (e.g., compliance with system- and business-related constraints), and that these goals will vary from one implementation to another. It will be further appreciated that such development effort might be complex and time-consuming, but would nevertheless be a routine undertaking for those of ordinary skill having the benefit of this disclosure.

In the following description, for purposes of explanation, numerous specific details are set forth in order to provide a thorough understanding of the inventive concept. As part of the description, some structures and devices may be shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Figure 1A:
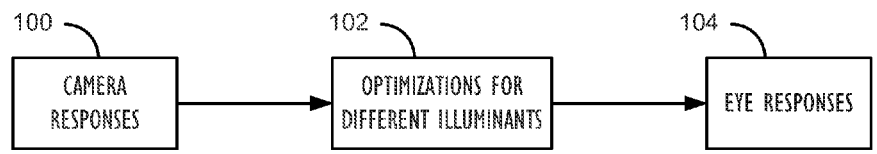
FIG. 1A illustrates a perceptual model for correcting camera response to the sensitivity of the human eye, in accordance with prior art teachings.

Turning first to FIG. 1A, a perceptual model for correcting camera response to the sensitivity of the human eye is shown for explanatory purposes. At basic level, a camera's image sensor will have characteristic responses 100 to incident light across the entire spectrum of wavelengths to which the image sensor is sensitive. The scene being captured may also be lit by different types of illuminants, which can have an effect on the way that the colors in the scene will be reproduced and perceived by the human eye. Thus, different optimizations 102, such as color balancing, may be employed based on different illuminant types.

If the image sensor's sensitivity is the same as the sensitivity of the human eye across the visible ranges of the human eye, then no further color correction beyond color balancing may be needed; however, if the image sensor's sensitivity and the sensitivity of the human eye are different across the particular range of the human vision, then further color correction, such as the application of a color correction matrix (CCM) may also be employed to the image sensor captured data to ensure the perception of the color by the human eye 104 is as accurate as possible to the real-world scene color.

Figure 1B:
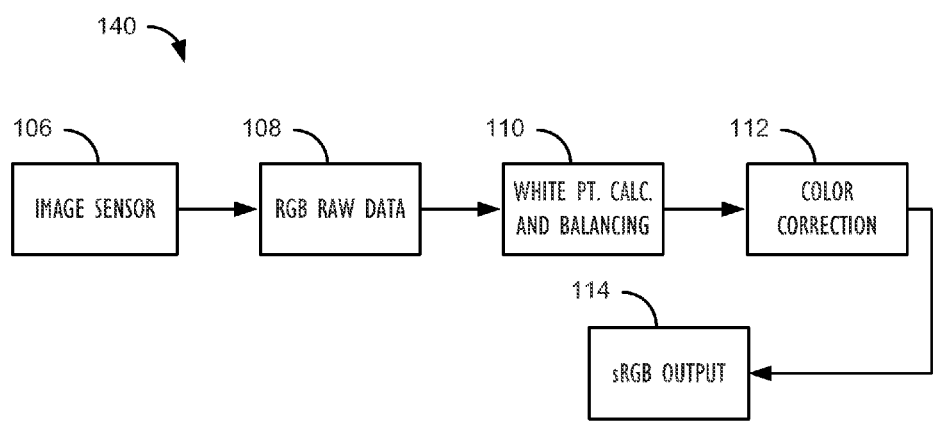
FIG. 1B illustrates an abstractive and conceptual image processing pipeline for performing color correction, in accordance with prior art teachings.

Turning now to FIG. 1B, an abstractive and conceptual image processing pipeline 140 for performing color correction is shown for explanatory purposes. First, the scene is captured by an image sensor 106. Data is output from the image sensor in RGB raw data format 108. Next, a scene white point is calculated and a white balance algorithm is run over the captured image sensor data 110 to determine if the gains of any of the R, G, or B channels need to be adjusted so that a white pixel renders as white. Any of a number of possible white balance algorithms may be used, such a gray world algorithm, selective gray world algorithm, or weighted accumulator algorithm. Next, depending on the type of illuminant, further color correction 112, for example, a CCM may be applied to the image data. The values in a CCM may be a function of both the scene white point and the scene lux level. Therefore, two images with the same white point could have very different CCMs. Once the image data has been color balanced and color corrected as desired, output data, e.g., in the form of sRGB (i.e., standard RGB), may be sent to a desired display device 114.

With this framework in mind, the remainder of the Detailed Description section is divided into the two sections. Section I discusses the definition and construction of a novel chromaticity space, and Section II will discuss the application of the chromaticity space to automatic white balance solutions.

Section I—Chromaticity Space

Figure 2:
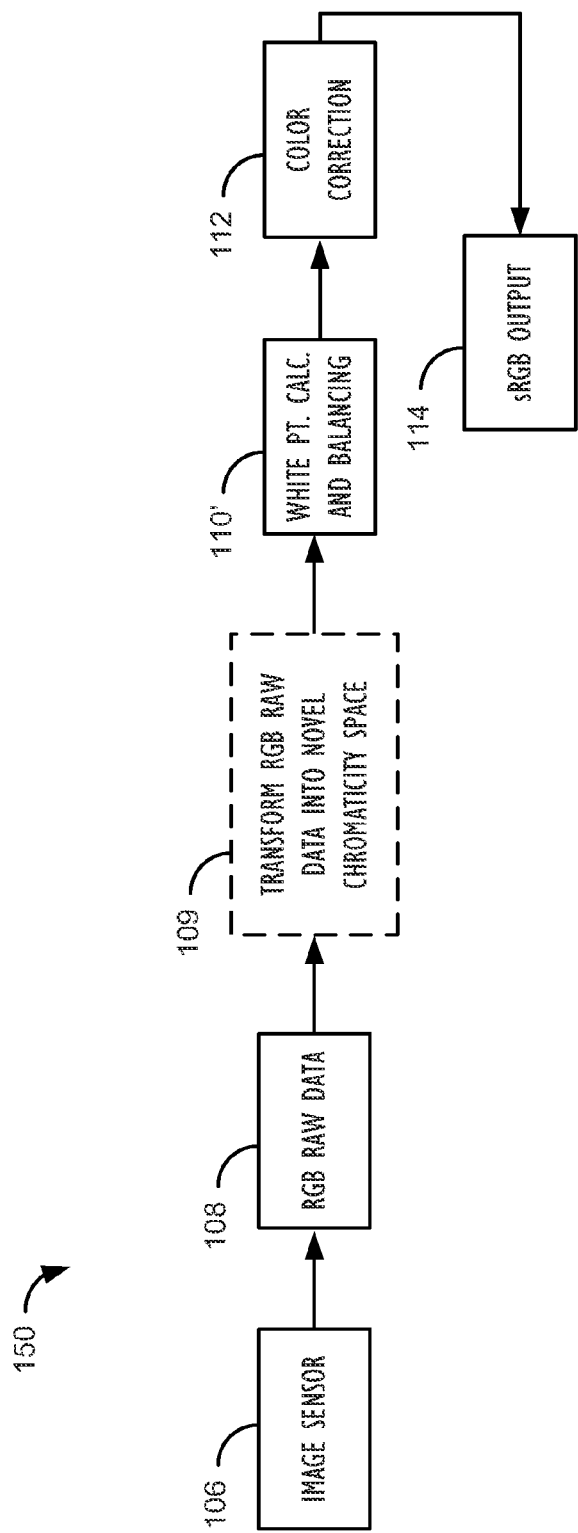
FIG. 2 illustrates an improved image processing pipeline for performing color balancing and correction utilizing a novel chromaticity space, in accordance with one embodiment.

Turning now to FIG. 2, an improved image processing pipeline 150 for performing color correction utilizing a novel chromaticity space is shown, in accordance with one embodiment. Compared to image processing pipeline 140 shown in FIG. 1B, the improved image processing pipeline 150 has an element 109 labeled "Transform RGB raw data into novel chromaticity space" between the receiving of raw data at element 108 and the performance of white point calculation and color balancing at element 110'. Element 110' in FIG. 2 differs from element 110 in FIG. 1B in that the scene white point is calculated in the novel chromaticity space constructed in element 109. In this Section, the transformations of raw data into the novel chromaticity space 109 will be described in further detail.

According to some embodiments, the novel chromaticity space may be defined by a series of mathematical transformations in order to give the space a concise physical meaning. The transformation parameters are optimized to adapt to specific sensors' spectral sensitivity. Exemplary transforms and parameters are detailed below.

Linear RGB to RYB Transform

Figure 3:
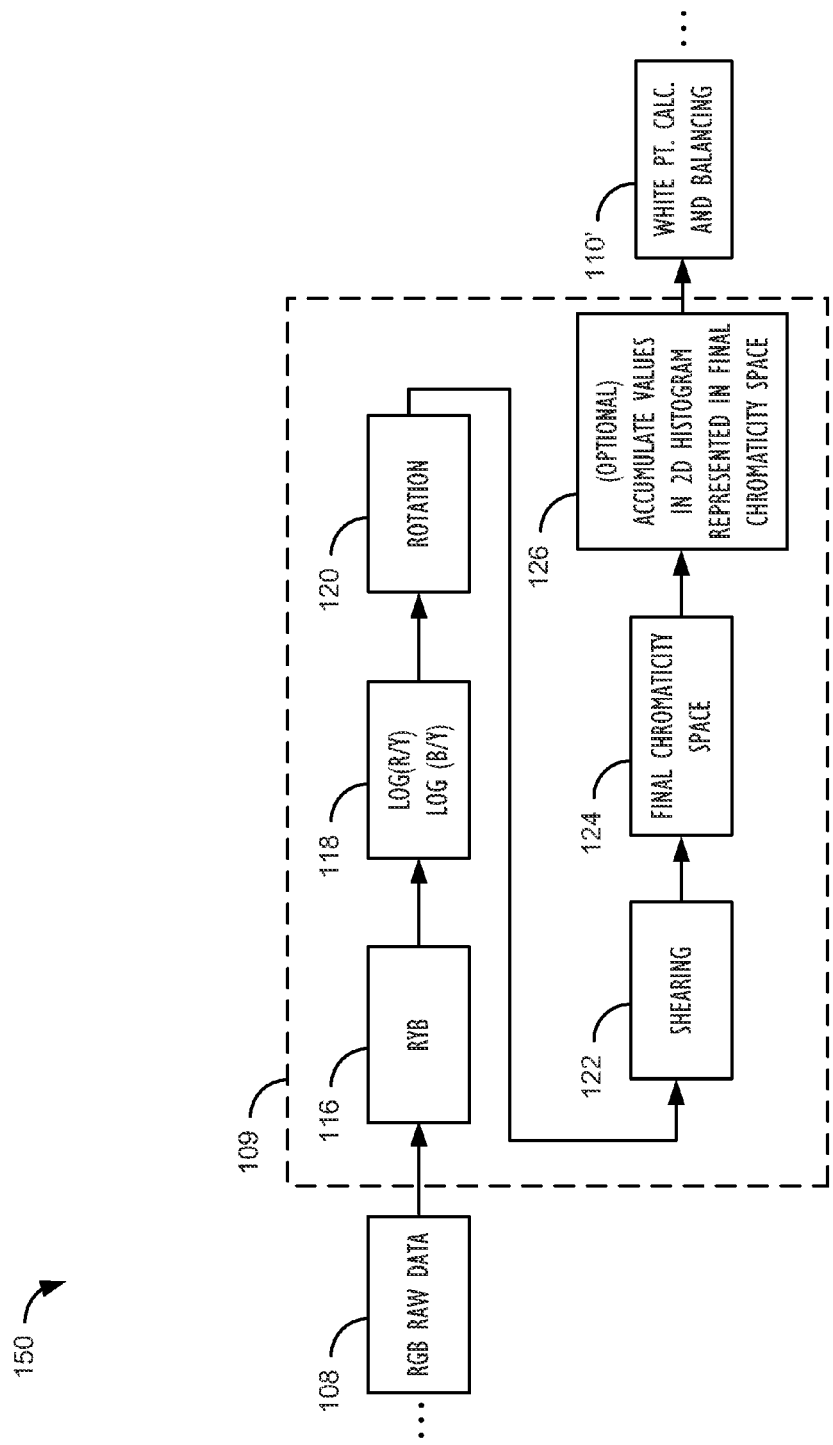
FIG. 3 illustrates in greater detail a process for creating a novel chromaticity space, in accordance with one embodiment.

As mentioned above, image sensor information may come into the image processing pipeline 150 from the image sensor in the form of RGB raw data, i.e., an unprocessed linear RGB signal that is not ready for display. Turning now to FIG. 3, the transformation process flow 109 of the novel chromaticity space is shown in greater detail. In order to reduce the input signal from three color dimensions (i.e., red, green, and blue)

into two color dimensions, the RGB signal may converted to a "pseudo luminance" signal Y where the Y stands for "pseudo luminance" in this embodiment (Element 116). Y is called pseudo luminance in this embodiment because it is not calculated according to the ITU-R Recommendation BT.709 standard definition of luminance (more commonly known by the abbreviations Rec. 709 or BT.709) or other standard definitions of luminance. Instead, pseudo luminance in this instance may be calculated as the weighted sum of the input linear RGB signal:

$$Y=w1*R+w2*G+w2*B, \text{ where } w1+w2+w3=1.0 \quad \text{(Eqn. 1.1)}$$

The values of the weighting coefficients w1, w2, and w3 may be optimized a priori for a particular image sensor based on one or more specific physical constraints imposed upon the novel chromaticity space, as will be described in further detail later.

Next, the RYB values are converted to chromaticity values, and an optional nonlinear transform such as log transformation may be applied according to the following equations (Element 118):

$$c1=\log(R)-\log(Y)$$

$$c2=\log(B)-\log(Y) \quad \text{(Eqns. 1.2)}$$

It should be noted that performing a log transformation as shown above is but one example of a possible transformation to be applied to chromaticity values, and that other types of transformations, such as power function, may be applied based on a particular implementation.

Next, values in the 2D chromaticity space whose parameters are derived from Eqns. 1.2 above may be rotated according to a matrix, M, as shown in Eqn. 1.3 (Element 120):

$$C=M*c, \text{ where } c \text{ is the 2D vector from Eqn. 1.2 consisting of } c1 \text{ and } c2; \quad \text{(Eqn. 1.3)}.$$

The matrix, M, consists of values that will give the chromaticity space its unique physical attributes. In one particular embodiment described herein, the rotation matrix M will rotate the chromaticity space such that the "black body" line, which is formed by the chromaticity coordinates of black body light sources, is essentially parallel with the horizontal axis of the chromaticity space. The rotation angle of chromaticity space is then the angle formed by the line connecting the y coordinates of two chosen blackbody light sources against horizontal direction. The rotation matrix may be the standard 2D rotation matrix calculated from the rotation angle, θ:

$$M = \begin{bmatrix} \cos(\theta) & -\sin(\theta) \\ \sin(\theta) & \cos(\theta) \end{bmatrix}$$

The transformation process may also optionally include the performance of shear mapping (Element 122) parallel to the x-axis, according to the following matrix multiplication, where k is a shearing coefficient that is optimized in order to enforce one or more desired chromaticity space physical properties:

$$\begin{bmatrix} x' \\ y' \end{bmatrix} = \begin{bmatrix} 1 & k \\ 0 & 1 \end{bmatrix} \begin{bmatrix} x \\ y \end{bmatrix}$$

Such a calculation may be done, for example, to align all white points having the same correlated color temperature (CCT) along the same x-coordinate in the novel chromaticity space The parameter k is then calculated accordingly to achieve this goal. The CCT is defined by the International Commission on Illumination (CIE) as the temperature of the Planckian radiator whose perceived color most closely resembles that of a given stimulus at the same brightness and under specified viewing conditions. In other words, the aim of the CCT is to describe the dominant color of a light source without regard to human visual response or the type of source illuminant. Lights sources with a correlated color temperature, i.e., light sources that are not pure incandescent radiators (i.e., not "black bodies") do not have an equal radiation response at all wavelengths in their spectrum. As a result, they can emit disproportionate levels of radiation when rendering certain colors. These light sources are measured in theft ability to accurately render all colors of their spectrum, in a scale that is called the Color Rendering Index (CRI). CRI is rated on a scale from 1-100. The lower the CRI rating, the less accurately colors will be reproduced by a given light source. Light sources that are true incandescent radiators (i.e., "black bodies") have a CRI of 100, meaning that all colors in their spectrum are rendered equally.

At this point, the series of transformations described above will have created the final chromaticity space (Element 124) having concise physical properties and meaning across various image sensors with differing spectral sensitivities.

The novel chromaticity space may then optionally be used to accumulate pixel values in the form of a two-dimensional histogram (Element 126). Keeping a 2D histogram of pixel data as represented in the novel chromaticity space provides a rich resource for performing any of a number of AWB algorithms to generate a scene white point. Further, the design of the novel chromaticity spaces described above allows for the application of rules with clear physical meaning to analyze the data accumulated in the 2D histogram that can provide additional computational efficiency. Of course, use of such an accumulation histogram is not necessary, and any number of white point calculation methods or other image processing applications may be employed with the novel chromaticity space.

As will be discussed in greater detail below, when white balance is subsequently performed (Element 110') on the data accumulated in the novel chromaticity space, white point constraint projections may be performed with greater ease and efficiency, owing to the physical properties of the novel chromaticity space.

Properties of the Chromaticity Space

As mentioned above, the parameters of the transformations defined above that are used to build the novel chromaticity space may be optimized for a given imaging sensor's spectral sensitivity, such that the chromaticity space will have the following exemplary physical properties for any sensor that is used to capture images. (These chromaticity space properties are described as being "physical" because their enforcement produces a tangible effect on the shape and arrangement of the resultant chromaticity space that can later be leveraged to make white point calculations and projections more efficient.)

1.) In the final 2D chromaticity space, black body light source x-coordinates will form an essentially straight horizontal line. This horizontal axis is along blue-red direction that corresponds to correlated color temperature (CCT). The horizontal axis is said to be along the "blue-red" direction because cooler light sources, i.e., light sources with a higher CCT are often described as "blueish," whereas warmer light sources, i.e., light sources with a lower CCT are often described as "reddish." The straight horizontal line in the final 2D chromaticity space is achieved through the pseudo luminance calculation using optimized values for the weighting coefficients w1, w2, and w3 described in Eqn. 1.1 above and the rotation matrix, M, described in Eqn. 1.3 above. For example, the weighting coefficients may be determined for a given sensor by minimizing an error metric, such as the standard deviation of the transformed black body points from a best-fitting horizontal line in the resultant chromaticity space. The black body line formed in the resultant novel chromaticity space is described as being essentially straight because, although it may not be perfectly horizontal in the final chromaticity space, the transformation and rotation parameters will be optimized to make the black body line as straight as possible. Other techniques may be employed to enforce this property as well, based on a particular implementation and tolerance levels for enforcement of the property.

2.) The vertical axis in the final 2D chromaticity space is along the "green-purple" direction. This axis is referred to as the "green-purple" direction because, as a light source moves above the black body line, light sources begin to appear more purple, and as light sources move below the black body line, the light sources begin to appear greener. Along the vertical axis, as the y-coordinate of a light source moves farther away from the horizontal blackbody line, the color rendering index (CRI) of that the light source decreases.

The above two properties establish a Euclidean chromaticity space with somewhat orthogonal color definitions. The correlation of the x-coordinates in the chromaticity space to the CCT of the light source is another important property for color-related manipulation.

Because the weighting coefficients (e.g., w1, w2, and w3) and rotation matrix (e.g., M) parameters of the chromaticity space are optimized such that the unique properties of this chromaticity space described above are enforced for any number of particular imaging sensors having distinct spectral sensitivity responses, the exact transforms employed will be different for different sensors, but will result in a chromaticity space with the chromaticity space physical properties outlined above. The application of the chromaticity space transformations using optimized parameters as outlined above isolates the effects of individual sensor spectral response variation that are to be expected from different sensors made by different manufacturers. This sensor response transparency allows the transformations to be executed in this chromaticity space independent of sensor type and maintains the ability to perform conceptually clean white point calculation and constraint operations, as will be described below.

Figure 4:
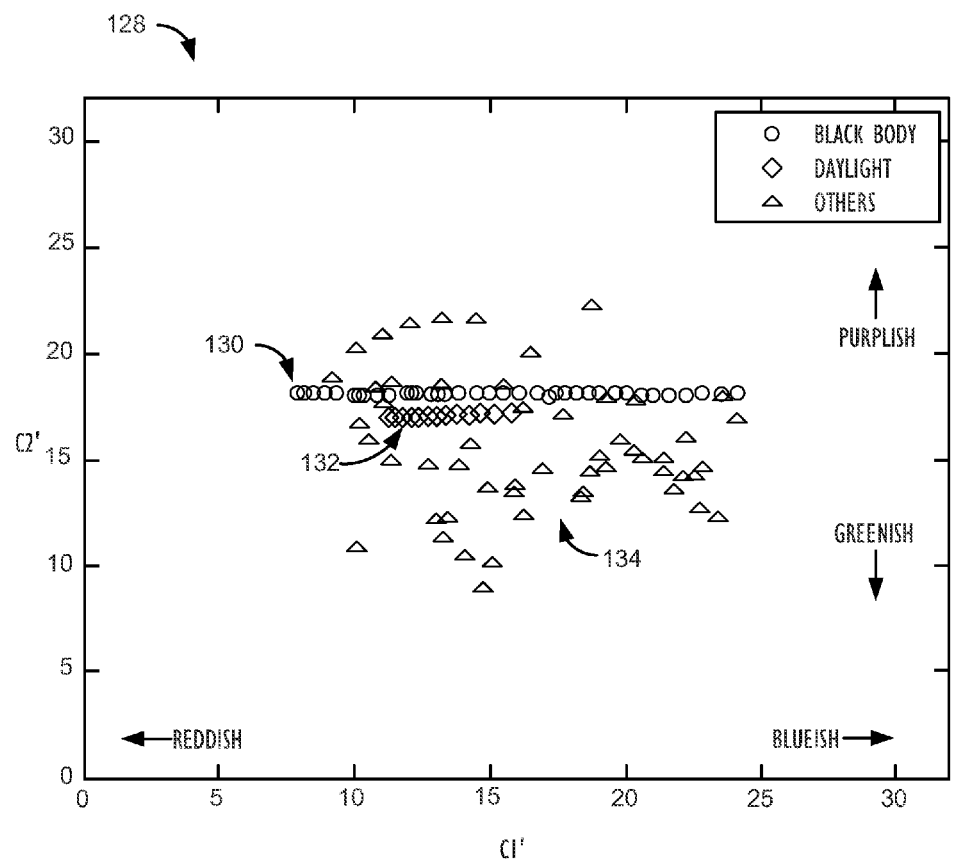
FIG. 4 illustrates a plot of light source white point coordinates in a novel chromaticity space, in accordance with one embodiment.

FIG. 4 illustrates one embodiment of a 2D plot 128 of light source white point coordinates in the novel chromaticity space discussed above, in accordance with one embodiment. The horizontal axis of the plot is labeled c1' (i.e., transformed c1 chromaticity values) and corresponds roughly to CCT. This axis is said to correspond to CCT because the transformations described above were optimized such that all white points having the same CCT would align along the same x-coordinate in the novel chromaticity space. Likewise, the vertical axis of the graph is labeled c2' (i.e., transformed c2 chromaticity values) and corresponds roughly to CRI. This axis, too, provides a concise physical meaning, in that, the horizontal black body line corresponds to a CRI value of roughly 100, and thus, the farther a given white point is below the black body line, the lower the CRI of that illuminant is. In the plot 128, the circles 130 represent the coordinates of the white points of black body radiators of various temperatures. The black body radiators form an essentially horizontal line across the domain of CCTs. The diamonds 132 represent daylight with different CCTs. The triangles 134 represent other types of light sources, including cool white fluorescent lights, compact fluorescent lights, LED lights, etc. Triangles falling below the black body line represent more greenish light sources, such as fluorescent lights.

It should also be noted that the definition of horizontal and vertical directions are interchangeable. In other words, the rotation of the chromaticity space employed by matrix M in Eqn. 1.3 above could instead make the vertical axis correspond to CCT and the horizontal axis correspond to CRI.

Section II—White Point Constraining Through Projection

Many variations of AWB and applications employing AWB can be built and run in this novel chromaticity space. As such, the details of any particular AWB algorithm are not discussed in further detail here. Instead, a particular aspect of AWB algorithms, white point constraint through projection, will be discussed in the context of the novel chromaticity space that has been characterized and described above.

Due to various limitations and known conditions, an initially calculated scene white point may be subjected to further constraining so that it falls within what is considered a valid range for white points. This further constraint of a calculated white point is often needed in order to arrive at a final, realistic white point for the scene. For example, if the scene lux is in the sunny daylight range, it makes sense to limit the white point around the daylight range (see diamonds 132 in FIG. 4). For reference, average indoor lighting ranges from 100 to 1,000 lux, and average outdoor sunlight is about 50,000 lux. By measuring scene lux, a likely lighting source type may be inferred, and a range of known possible white values for such a light source may be used as an additional constraint on the white point.

Figure 5:
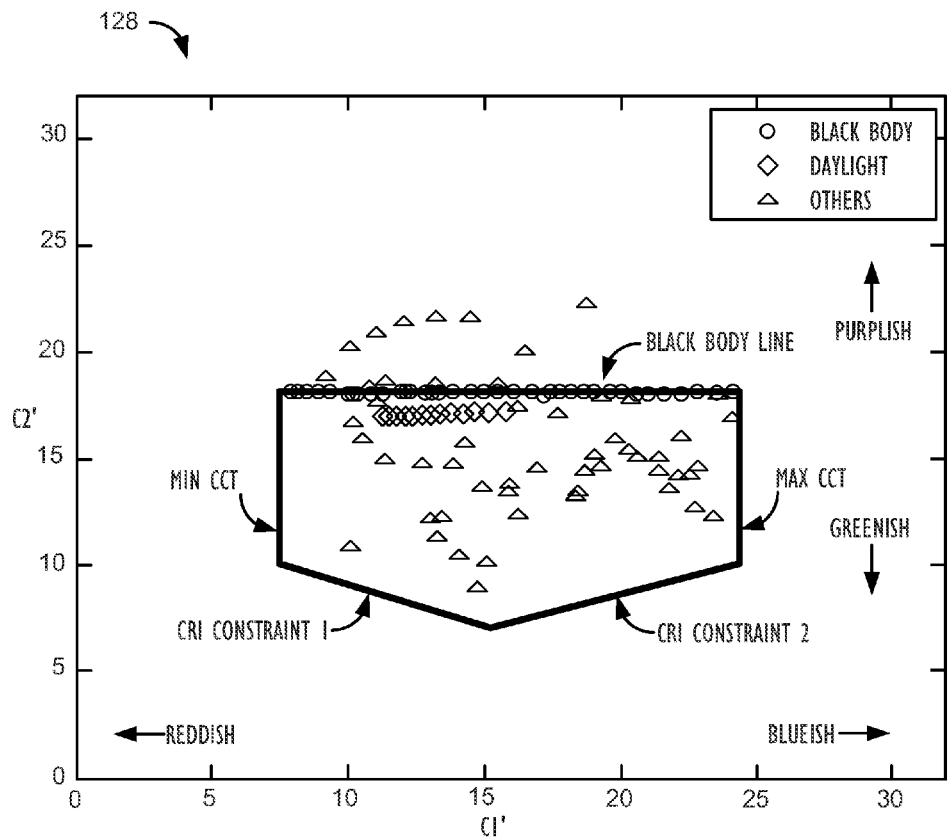
FIG. 5 illustrates a white point constraint zone in a novel chromaticity space, in accordance with one embodiment.

The unique properties of the above-defined chromaticity space allow a conscious white point constraining strategy with clear physical meaning to be employed. FIG. 5 illustrates a white point constraint zone in the novel chromaticity space, in accordance with one embodiment. In such a chromaticity space, the ranges of the white point under different kinds of conditions can be defined by polygons. In one embodiment, a pentagon provides a convenient definition for the white point boundaries. The pentagon can be degenerated into a number of line segments that serve to constrain the white point possible locations. One such exemplary polygon is illustrated by the pentagon shape shown as drawn with thick black lines FIG. 5.

Looking at FIG. 5, the upper horizontal line is the "black body line." The two vertical boundaries, labeled "Min CCT" and "Max CCT," are defined by the CCT range where white points are allowed to exist. The bottom projection lines, labeled "CRI Constraint 1" and "CRI Constraint 2" complete the total encapsulation of the valid white point zone under these assumptions. Thus, the pentagon white point zone shown in FIG. 5 can be defined by the following exemplary rules as to where the white point can be: RULE 1.) No white point can be above the black body line; RULE 2.) No white point can be outside of a certain CCT range; and RULE 3.) No white point can be beyond a certain distance from blackbody white points, depending on its CCT. White points that fall initially outside the zone defined by the rules enumerated above can be projected back into the zone, so that a realistic white point for the scene is chosen (see Element 110' in FIG. 3).

Because of the physical meaning the chromaticity space, the projection to bring an initially out-of-bounds white point back into the defined polygon zone is done according to the physical constraints placed on the defined white point zone, making the definition of projection behavior and its consequences conceptually clean and predictable. To illustrate this concept, FIG. 6 shows various white point projection zones in conjunction with a pentagonal white point constraint zone in the novel chromaticity space, in accordance with one embodiment.

Figure 6:
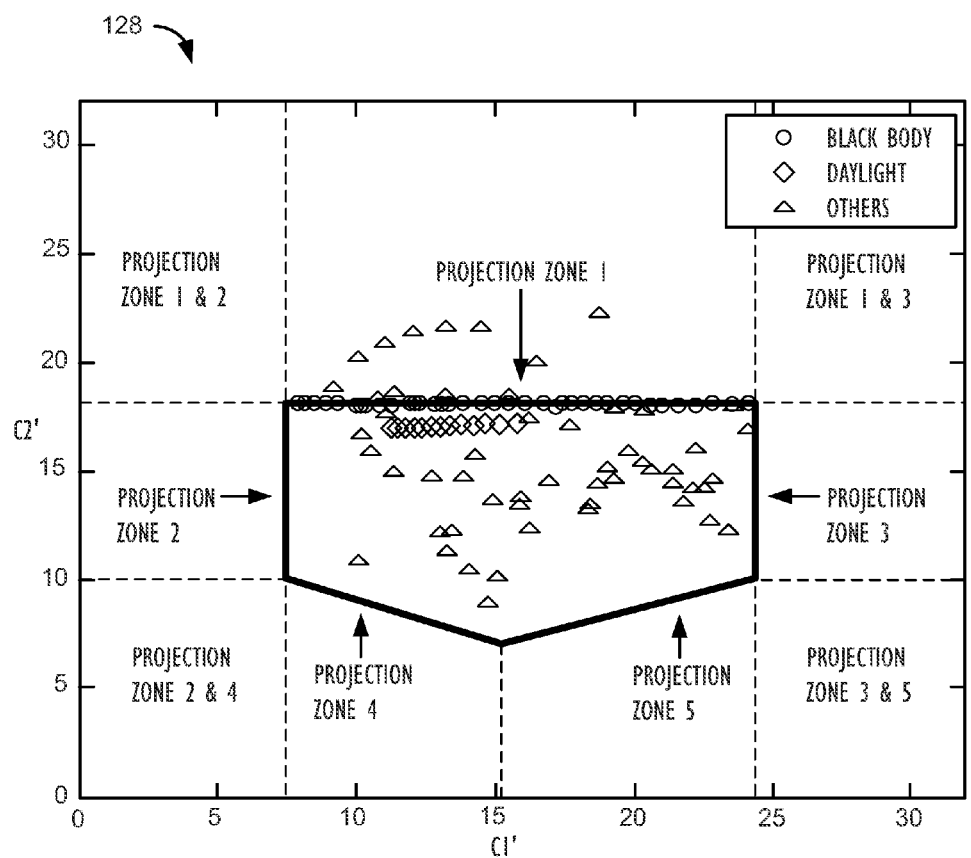
FIG. 6 illustrates various white point projection zones in conjunction with a white point constraint zone in a novel chromaticity space, in accordance with one embodiment.

For instance, and in reference to FIG. 6, if the initially calculated white point falls outside the defined pentagon and stays in "Projection Zone 1," the constraining projection could simply involve projecting the y-coordinate of the white point onto the blackbody line (following Rule 1, as stated above) and leaving the x-coordinate unchanged, i.e., performing a constant CCT projection. This projection maintains the white point's color temperature, as there is no x-coordinate change during the projection process, (Recall that one of the special properties of this chromaticity space is that x-coordinates in the chromaticity space correspond to a particular light source CCT.)

As is further illustrated in FIG. 6, white points outside the valid white point zone in any of the other various Projection Zones may also be projected back onto the polygon ring with dean conceptual meaning. For example, calculated white points that fall initially into Projection Zone 2 or Projection Zone 3 may be projected horizontally onto the polygon ring, as their CCT is outside the specified allowable range, while their CRI-related coordinate (i.e., c2') is within the specified allowable range. Further, calculated white points that fall initially into Projection Zone 4 or Projection Zone 5 may be projected vertically up onto the polygon ring, as their CCT is within the specified allowable range, while their CRI-related coordinate (i.e., c2') is outside the specified allowable range. For white points that fall within the zones labeled with a combination of projection zones (e.g., "Projection Zone 1 & 2" or "Projection Zone 1 & 3"), the projection may be accomplished separately and independently via a sequence of single-coordinate projections, which remains more computationally efficient than performing two-coordinate projections. For example, a white point falling in "Projection Zone 1 & 2" may first be projected down to the black body line, keeping the x-coordinate constant, and then projected over to the MIN CCT line keeping the y-coordinate constant.

A further simplification of the chromaticity space described above may be employed when the light source is known to be a black body type light source. One way to estimate whether a scene is illuminated by a black body type light source is to determine whether the scene is illuminated by a light source with or without flickering. Techniques to determine whether a scene is illuminated with a flickering light source are known to those of skill in the art. A flickering light source indicates an artificial light source, and, thus, the black body approximation is not a good one. If no flickering is detected and the light source is deemed to be a black body light source, however, then the projection into the white point constraint zone may be simplified to projecting the point up or down onto the blackbody line segment. Again, this type of projection would involve only the y-coordinate in this novel chromaticity space.

Thus, not only are the projections in this novel chromaticity space conceptually sound, they are also computationally-friendly because, for most applicable cases, only one coordinate of the white point will be involved in performing the projection calculation if it is outside the white point constraint zone for either axial direction. When the polygon is degenerated into individual line segments, the projections calculations are then correspondingly degenerated into point to line projections, followed by range-limiting operations if either (or both) of the coordinates of the white point are outside the line segment range. For calculated white points falling in a combination of projection zones, the range-limiting operations may be handled in the same way as the polygon projections described above, with the two coordinates of the white point being handled independently. For a calculated white point that has coordinates inside the line segment range, point to line projections may be carried out with either the CCT constant, the CRI property constant, or using a minimal distance rule.

Figure 7:
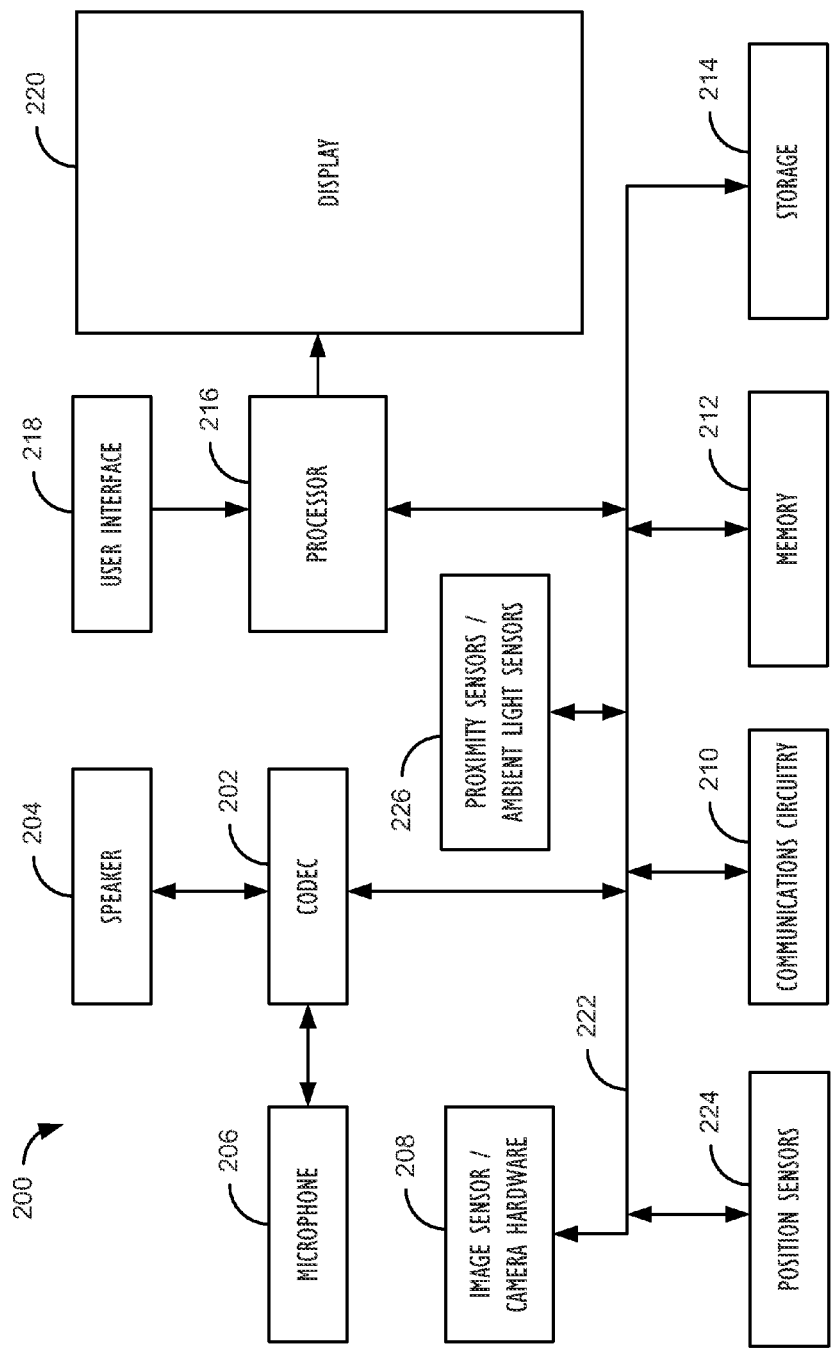
FIG. 7 illustrates a simplified functional block diagram of a representative electronic device possessing a display and an image sensor.

Referring now to FIG. 7, a simplified functional block diagram of a representative electronic device possessing a display 200 according to an illustrative embodiment, e.g., electronic image capture device 200, is shown. The electronic device 200 may include a processor 216, display 220, proximity sensor/ambient light sensor 226, microphone 206, audio/video codecs 202, speaker 204, communications circuitry 210, position sensors 224 (e.g., accelerometers or gyrometers), image sensor with associated camera hardware 208, user interface 218, memory 212, storage device 214, and communications bus 222. Processor 216 may be any suitable programmable control device and may control the operation of many functions, such as the generation and/or processing of image metadata, as well as other functions performed by electronic device 200. Processor 216 may drive display 220 and may receive user inputs from the user interface 218. An embedded processor provides a versatile and robust programmable control device that may be utilized for carrying out the disclosed techniques.

Storage device 214 may store media (e.g., image and video files), software (e.g., for implementing various functions on device 200), preference information, device profile information, and any other suitable data. Storage device 214 may include one more storage mediums for tangibly recording image data and program instructions, including for example, a hard-drive, permanent memory such as ROM, semi-permanent memory such as RAM, or cache. Program instructions may comprise a software implementation encoded in any desired language (e.g., C or C++).

Memory 212 may include one or more different types of memory which may be used for performing device functions. For example, memory 212 may include cache, ROM, and/or RAM. Communications bus 222 may provide a data transfer path for transferring data to, from, or between at least storage device 214, memory 212, and processor 216. User interface 218 may allow a user to interact with the electronic device 200. For example, the user input device 218 can take a variety of forms, such as a button, keypad, dial, a click wheel, or a touch screen.

In one embodiment, the personal electronic device 200 may be an electronic device capable of processing and displaying media, such as image and video files. For example, the personal electronic device 200 may be a device such as such a mobile phone, personal data assistant (PDA), portable music player, monitor, television, laptop, desktop, and tablet computer, or other suitable personal device.

The foregoing description of preferred and other embodiments is not intended to limit or restrict the scope or applicability of the inventive concepts conceived of by the Applicant. As one example, although the present disclosure focused on handheld personal electronic image capture devices, it will be appreciated that the teachings of the present disclosure can be applied to other implementations, such as traditional digital cameras, in exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A non-transitory program storage device readable by a programmable control device comprising instructions stored thereon to cause the programmable control device to:
   obtain image data from an image sensor of an image capture device;
   transform the image data into chrominance values, wherein the chrominance values exist in a two-dimensional chromaticity space;
   rotate the chromaticity space to enforce a first chromaticity space physical property;
   shear at least some the transformed image data to enforce a second chromaticity space physical property;
   identify a white point constraint zone in the chromaticity space, based at least in part on the first chromaticity space physical property; and
   calculate a white point for the image data in the chromaticity space,
   wherein the instructions to cause the programmable control device to calculate a white point further comprise instructions to cause the programmable control device to project the calculated white point back into the identified white point constraint zone.

2. The non-transitory program storage device of claim 1, wherein the instructions to cause the programmable control device to calculate a white point further comprise instructions to cause the programmable control device to:
   create a two-dimensional histogram over the chromaticity space; and
   accumulate the transformed image data in the histogram.

3. The non-transitory program storage device of claim 1, wherein the instructions to cause the programmable control device to project the calculated white point back into the identified white point constraint zone further comprise instructions to cause the programmable control device to use a single-coordinate projection operation.

4. The non-transitory program storage device of claim 1, wherein the instructions to cause the programmable control device to project the calculated white point back into the identified white point constraint zone further comprise instructions that are based at least in part on the first chromaticity space physical property.

5. The non-transitory program storage device of claim 1, wherein the instructions to cause the programmable control device to identify a white point constraint zone in the chromaticity space are further based at least in part on the second chromaticity space physical property.

6. The non-transitory program storage device of claim 1, wherein the first chromaticity space physical property comprises black body light source coordinates forming an essentially straight line over a first range when plotted in the chromaticity space.

7. The non-transitory program storage device of claim 6, wherein the second chromaticity space physical property comprises a color rendering index (CRI) of a light source decreasing the farther it moves away from the essentially straight line.

8. The non-transitory program storage device of claim 1, wherein the white point constraint zone comprises a polygonal ring.

9. The non-transitory program storage device of claim 7, wherein the white point constraint zone comprises a polygonal ring.

10. The non-transitory program storage device of claim 1, wherein the instructions to cause the programmable control device to transform the image data into chrominance values comprise instructions to cause the programmable control device to use weighting coefficients optimized for the spectral sensitivity of the image sensor.

11. The non-transitory program storage device of claim 1, wherein the instructions to cause the programmable control device to enforce the first chromaticity space physical property comprise instruction that are based at least in part on the spectral sensitivity of the image sensor of the image capture device.

12. The non-transitory program storage device of claim 1, wherein the first and second chromaticity space physical properties are the same.

13. An apparatus comprising:
   an image sensor;
   a programmable control device;
   a memory coupled to the image sensor and the programmable control device, wherein instructions are stored in the memory, the instructions, when executed by the programmable control device, cause the programmable control device to:
      obtain RGB image data from an image captured by the image sensor;
      calculate a weighted sum of the RGB image data using a plurality of weights to generate a pseudo luminance value (Y), wherein the plurality of weights are optimized based on a spectral sensitivity of the image sensor, and wherein the generated pseudo luminance value (Y) is used to generate RYB image data;
      perform a non-linear transform on the RYB image data;
      transform the non-linear RYB image data into chrominance values, wherein the chrominance values exist in a two-dimensional chromaticity space;
      rotate the chromaticity space to enforce a first chromaticity space physical property;
      identify a white point constraint zone in the chromaticity space based, at least in part, on the first chromaticity space physical property; and
      calculate a white point for the image data in the chromaticity space,
      wherein the instructions to cause the programmable control device to calculate a white point further cause the programmable control device to project the calculated white point back into the identified white point constraint zone.

14. The apparatus of claim 13, wherein the instructions stored in the memory further comprise instructions to cause the programmable control device to scale at least some of the transformed non-linear RYB image data to fit in the chromaticity space.

15. The apparatus of claim 13, wherein the instructions stored in the memory further comprise instructions to cause the programmable control device to perform a shear operation on the transformed non-linear RYB image data to enforce a second chromaticity space physical property.

16. The apparatus of claim 13, wherein the instructions to cause the programmable control device to project the calculated white point back into the identified white point constraint zone are based at least in part on the first chromaticity space physical property.

17. The apparatus of claim 13, wherein the white point constraint zone comprises a polygonal ring.

18. The apparatus of claim 13, wherein the instructions to cause the programmable control device to enforce the first chromaticity space physical property are based at least in part on the spectral sensitivity of the image sensor.

19. An embedded logic device comprising a processor and a memory device, wherein instructions are stored on the memory device, the instructions, when executed by the processor cause the processor to:
- obtain image data from an image captured by an image sensor;
- transform the image data into chrominance values, wherein the chrominance values exist in a two-dimensional chromaticity space;
- rotate the chromaticity space to cause black body light source coordinates to form an essentially straight line in the chromaticity space;
- identify a white point constraint zone in the chromaticity space, based at least in part on the location of the essentially straight line in the chromaticity space;
- scale at least some of the transformed image data to fit in the chromaticity space; and
- calculate a white point for the image data in the chromaticity space,
- wherein the embedded logic device is further configured to project the calculated white point back into the identified white point constraint zone.

20. The embedded logic device of claim 19, wherein the act of transforming the image data into chrominance values further comprises calculating a pseudo luminance value using a plurality of determined weighting coefficients.

21. A non-transitory program storage device readable by a programmable control device comprising instructions stored thereon to cause the programmable control device to:
- obtain image data from an image captured by an image sensor of a device;
- transform the image data into chrominance values, wherein the chrominance values exist in a two-dimensional chromaticity space;
- rotate the chromaticity space to cause black body light source coordinates to form an essentially straight line in the chromaticity space;
- identify a white point constraint zone in the chromaticity space, based at least in part on the location of the essentially straight line in the chromaticity space; and
- calculate a white point for the image data in the chromaticity space based, at least in part, on the identified white point constraint zone,
- wherein the instructions to cause the programmable control device to calculate a white point further comprise instructions to cause the programmable control device to project the calculated white point back into the identified white point constraint zone.

* * * * *